(12) United States Patent  (10) Patent No.: US 9,222,571 B2
Gonze et al.  (45) Date of Patent: Dec. 29, 2015

(54) TEMPERATURE MANAGEMENT SYSTEM FOR TRANSMISSION USING SPLIT ENGINE COOLING

(71) Applicant: GM Global Technology Operations LLC, Detroit, MI (US)

(72) Inventors: Eugene V. Gonze, Pinckney, MI (US); Casie M. Bockenstette, Clarkston, MI (US); Kurt Alfred Wellenkotter, Beverly Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 41 days.

(21) Appl. No.: 14/026,292

(22) Filed: Sep. 13, 2013

(65) Prior Publication Data

US 2015/0080179 A1  Mar. 19, 2015

(51) Int. Cl.
*F16H 59/00* (2006.01)
*F16H 57/04* (2010.01)

(52) U.S. Cl.
CPC .................................. *F16H 57/0413* (2013.01)

(58) Field of Classification Search
CPC ............... F16H 2057/2043; F16H 2057/2047; F16H 57/0412; F16H 57/0413; F16H 57/0415; F16H 57/0416

USPC ................. 475/159; 74/467, 606 R; 180/339; 477/98; 701/51; 123/41.31
See application file for complete search history.

(56) References Cited

U.S. PATENT DOCUMENTS

| | | | |
|---|---|---|---|
| 2,926,737 A * | 3/1960 | Fischer | 180/54.1 |
| 6,616,059 B2 * | 9/2003 | Sabhapathy et al. | 237/12.3 B |
| 2003/0217707 A1 * | 11/2003 | Iwasaki | 123/41.31 |
| 2004/0045749 A1 * | 3/2004 | Jaura et al. | 180/65.2 |
| 2006/0180103 A1 * | 8/2006 | Gruia | 123/41.31 |
| 2011/0088378 A1 * | 4/2011 | Prior et al. | 60/320 |
| 2011/0284200 A1 * | 11/2011 | Gooden et al. | 165/287 |
| 2012/0241141 A1 * | 9/2012 | Taylor | 165/283 |
| 2012/0312498 A1 * | 12/2012 | Kim | 165/41 |

* cited by examiner

*Primary Examiner* — Robert Hodge
*Assistant Examiner* — Tinh Dang

(57) ABSTRACT

A system for thermally managing a transmission having a transmission heat exchanger, wherein the transmission is coupled to an engine having a block and a head. A closed cooling circuit is provided to flow coolant through the system. A block output valve is provided for receiving coolant exiting the block and having a first outlet in fluid communication with the transmission heat exchanger and a second output connected to a bypass. Thermosensors may also be provided to determine the temperature of the block and the transmission. A system having a controller to thermally manage a transmission is also provided. A method of thermally managing a transmission is also provided.

9 Claims, 2 Drawing Sheets

TEMPERATURE MANAGEMENT SYSTEM FOR TRANSMISSION USING SPLIT ENGINE COOLING

FIELD

The present disclosure relates to a system for managing the temperature of a transmission and more particularly to a using split engine temperature management to manage the temperature of a transmission.

BACKGROUND

The statements in this section merely provide background information related to the present disclosure and may or may not constitute prior art.

Modern motor vehicle transmissions utilize a several quart or liter fill of transmission fluid (hydraulic oil). The transmission fluid serves several purposes. First and most obvious is the lubrication of the numerous rotating and moving parts within the transmission. Second is the transfer of heat in or out of the transmission to maintain an appropriate operating temperature and third is use in the pressurized hydraulic control system of the transmission.

To achieve proper heat transfer to the ambient for cooling, a transmission oil cooler remote from the transmission may be provided with a flow of transmission fluid.

During cold weather starts, the viscosity of the cold transmission fluid can cause significant parasitic frictional losses. Depending upon the temperature, it can be several minutes before the transmission fluid temperature rises into a range where frictional losses become negligible. This delay is primarily due to the fact that only frictional heating from the rotation of parts heats the transmission fluid. During this time, fuel economy can be significantly degraded.

It is therefore apparent that improved control of automatic transmission fluid temperature is desirable.

SUMMARY

The present invention provides a system for thermally managing a transmission having a transmission heat exchanger, wherein the transmission is coupled to an engine having a block. A closed cooling circuit is provided to flow coolant through at least the block and the transmission heat exchanger. A block output valve is provided for receiving coolant exiting the block and having a first output in fluid communication with the transmission heat exchanger and a second output connected to a transmission bypass wherein the bypass is connected to the cooling circuit. Thermosensors may also be provided to determine the temperature of the block and the transmission. Alternatively, the temperatures may also be calculated using sensors or other data.

In another embodiment, coolant from the block output valve may be directed at the bypass if the block temperature is below a block temperature threshold and the transmission temperature is below transmission temperature threshold.

In yet another embodiment, coolant from the block output valve may also be directed at the transmission heat exchanger if the block temperature is above a block temperature threshold and the transmission temperature is below transmission temperature threshold.

In yet another embodiment, coolant that has passed through thr radiator is directed to the transmission heat exchanger if the block temperature is above a block temperature threshold and the transmission temperature is above transmission temperature threshold.

Another embodiment discloses a method of thermally managing a transmission. The transmission has a transmission heat exchanger and coupled to an engine having a block, and a cooling circuit including a block cooling circuit which receives coolant from the cooling circuit. The temperature of the transmission and the block is determined. If the temperature of the transmission is below a threshold temperature of the transmission and the temperature of the block is below a block temperature threshold, flowing coolant through the block cooling circuit and bypassing the transmission heat exchanger. If the temperature of the transmission is below the a threshold temperature of the transmission and the temperature of the block is above the threshold temperature of the block, flowing coolant from the block cooling circuit through the transmission heat exchanger and back into the cooling circuit.

Another embodiment includes the step of if the temperature of the transmission is above the transmission threshold temperature and the temperature of the block is above block threshold temperature, flowing coolant through the block cooling circuit and flowing coolant directly through the transmission heat exchanger.

Yet another embodiment includes flowing coolant through a radiator to transfer heat from the cooling circuit to the environment if the temperature of the transmission is above the transmission threshold temperature and the temperature of the block is above block threshold temperature.

Another embodiment discloses a system for thermally managing a transmission having a transmission heat exchanger wherein the transmission is coupled to an engine having a block and the cooling circuit further comprises a block cooling circuit which receives coolant from the cooling circuit. The system includes a controller having logic to determine the temperature of the transmission and the block. If the temperature of the transmission is below a threshold temperature of the transmission and the temperature of the block is below a block temperature threshold, the controller directs coolant through the block cooling circuit and into the cooling circuit and bypassing the transmission heat exchanger. If the temperature of the transmission is below the a threshold temperature of the transmission and the temperature of the block is above the threshold temperature of the block, the controller directs coolant from the block cooling circuit through the transmission heat exchanger and back into the cooling circuit.

Yet another embodiment discloses a system wherein if the temperature of the transmission is above the transmission threshold temperature and the temperature of the block is above block threshold temperature, the controller directs coolant through the block cooling circuit and directly through the transmission heat exchanger.

Yet another embodiment discloses a system further comprising a transmission cooling valve in fluid communication with the transmission heat exchanger wherein the controller directs opening the transmission cooling valve to allow coolant to flow through the transmission heat exchanger.

Yet another embodiment discloses a system wherein the engine further comprises a head and the cooling circuit further comprises a head cooling circuit which receives coolant from the cooling circuit and wherein the controller directs coolant existing the head cooling circuit to bypass when the temperature of the transmission is below a threshold temperature of the transmission and the temperature of the block is below a block temperature threshold.

Further advantages, aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1A, 1B:
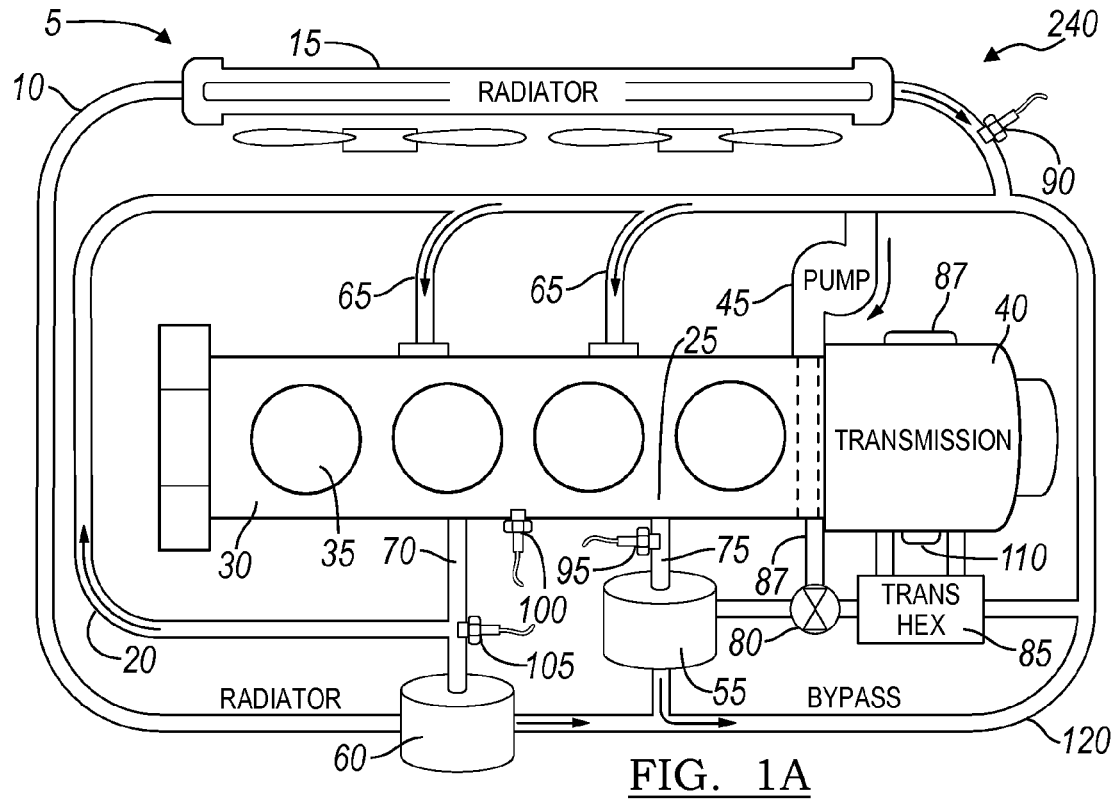
FIG. 1A is a schematic view of a temperature management system according to the present invention associated with a transmission.
FIG. 1B is a schematic view of a temperature management system according to the present invention associated with a transmission.
Figure 1C:
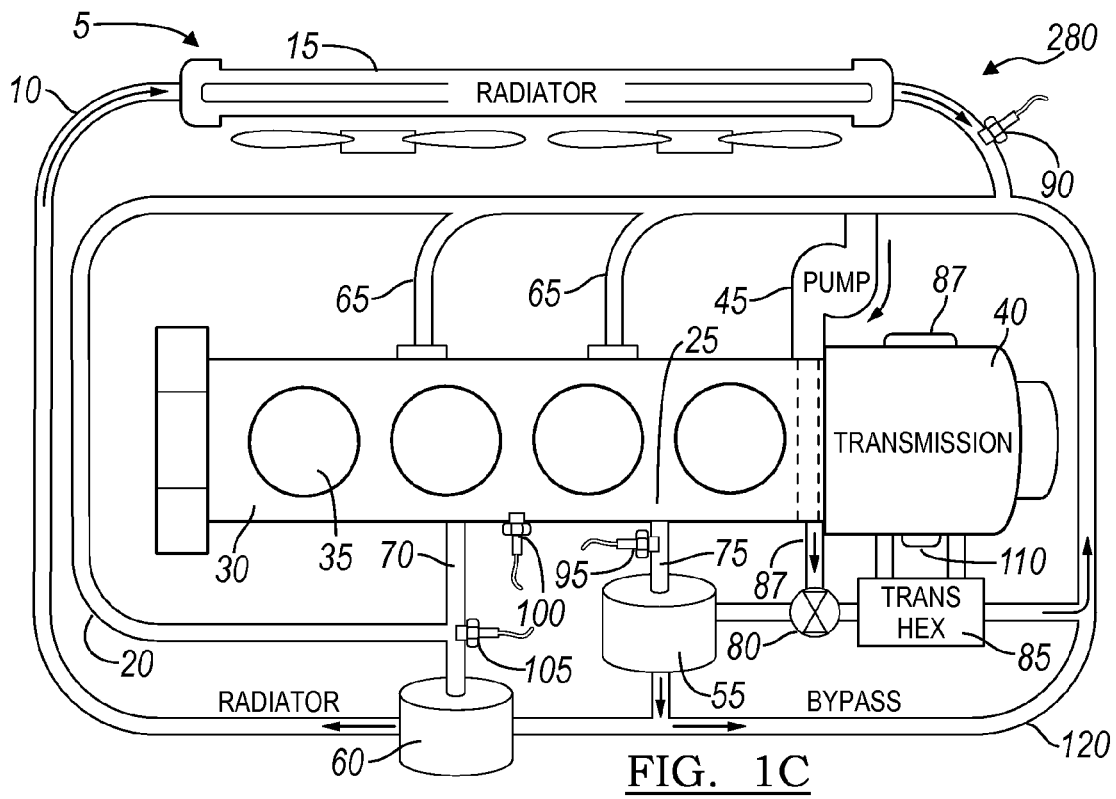
FIG. 1C is a schematic view of a temperature management system according to the present invention associated with a transmission.

With reference now to FIGS. 1A-1C, a temperature management system which is illustrated in association with a transmission is generally designated by the reference number 5.

The system 5 comprises cooling circuit generally shown as 10 including a radiator 15. The system 5 also includes an internal combustion engine 20 having a block 25 and a head 30 having at least one cylinder 35 in the head 30. A transmission 40 is coupled to the engine.

In a split engine cooling circuit, incoming coolant is split between the block 25 and head 30 and generally flows transverse the engine 20 although the invention would work with longitudinal flow. Using the transverse cooling technique ensures that the coolant does not contact multiple cylinders creating a more uniform and controlled cooling.

Using split cooling circuits, the block 25 and head 30 may be cooled at different temperatures to improve engine warm up, fuel efficiencies and other considerations. Generally, the head 30 warms up quickly due to combustion of fuel in the cylinder 35 while the block takes longer to warm up. In some split engine cooling circuits, the head 30 is cooled while the block 25 is allowed to warm up to a threshold temperature before coolant begins circulating in or around the block 25.

The transmission 40 is coupled to the cooling circuit 10 through a transmission heat exchanger 85 to either heat or cool the transmission 40 as necessary.

In operation, a pump 45 may be used to circulate coolant through the system 5 having various conduits and valves to direct flow. A radiator 15 is used to transfer heat from the cooling circuit to the environment. The cooling circuit is closed in that fluid continuously flows through the system entering and exiting various components as valves are opened and closed.

Threshold temperatures are determined for the block, 25, the head, and the transmission to ensure that they operate at optimal levels. Temperatures that are too high can result in premature wear of the parts and could require cooling whereas temperatures that are too low can increase friction and decrease engine efficiencies. For these components, there may be an upper threshold and a lower threshold creating a range of temperatures wherein the component operates optimally. For simplicity, however, a single threshold temperature will be described. These threshold temperatures and/or ranges may be different for the different components.

Temperature sensors, such as thermosensors or thermocouples, may be provided in the system to determine the actual temperature of the coolant and/or components. For example, radiator output thermosensor 90 may be used to determine the temperature of the coolant exiting the radiator 15. Block thermosensor 95 may be used to determine the temperature of the block 25 or coolant entering or existing the block 25. Head thermosensor 100 may be used to determine the temperature of the head 30 or coolant entering or exiting the head 30. Coolant thermosensor 105 may be used to determine the temperature of the coolant approximate the head valve 60. Transmission thermosensor 110 may be used to determine the temperature of the transmission 40 or coolant entering or exiting the transmission 40. The temmperatures may also be calculated using other sensors and temperature models.

The thermosensors are connected to a computer or controller (not shown) which receives the temperatures signals and compares them to threshold temperatures and operates valves as described below. The controller contains software, hardware, firmware or logic that allows it to open and close valves and direct the flow of coolant as necessary to thermally manage the transmission as described below.

Figure 2:
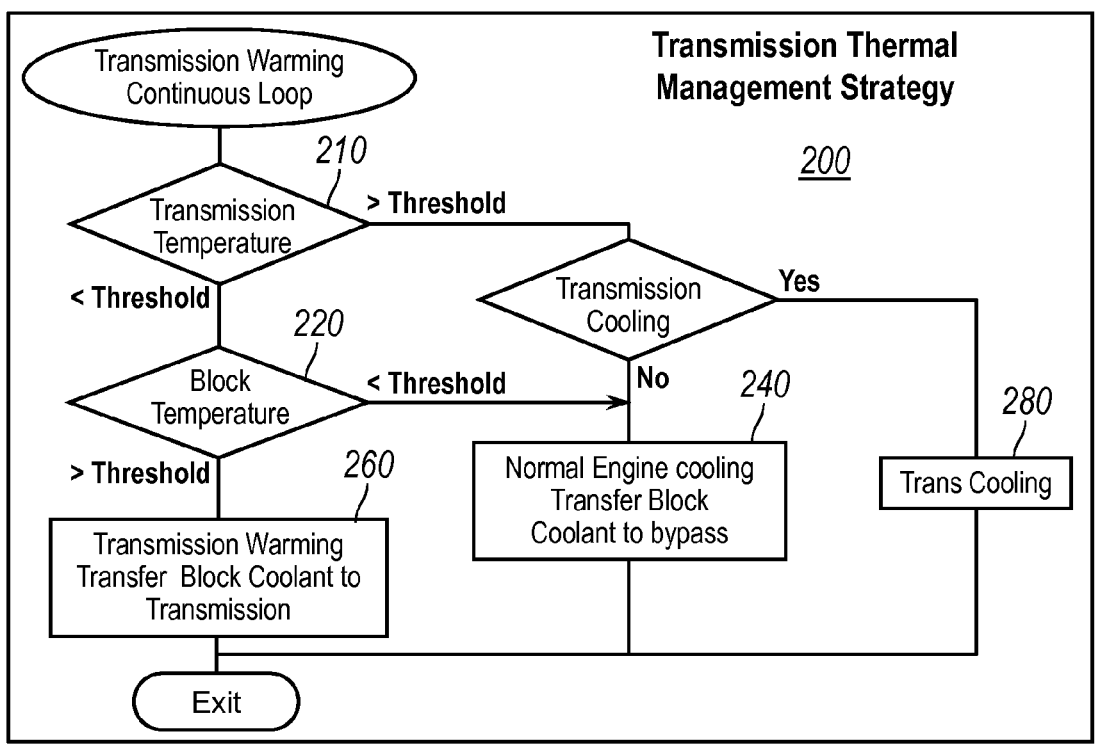
FIG. 2 is a flow chart of a transmission thermal management strategy.

Referring now to FIG. 2, three different transmission thermal management strategies are illustrated in the flow chart generally depicted as 200.

In block 210, the temperature of the transmission Ttrans is determined using thermosensor 110 or calculated and compared to the threshold temperature of the transmission THtrans. If the temperature of the transmission Ttrans is less than or equal to the transmission threshold temperature THtrans, block 220 then determines the temperature of the block Tblock using thermosensor 95. If the temperature of the block Tblock is below the threshold temperature of the block THblock, then coolant travels through the bypass takes place as described in block 240 and FIG. 1A.

If the temperature of the transmission Ttrans is greater than the transmission threshold temperature but no transmission cooling is desired, then normal engine cooling takes place and the coolant existing the block is sent to the bypass as shown in block 240 and FIG. 1A.

If the temperature of the block Tblock is greater than the threshold temperature of the block THblock, and the temperature of the transmission Ttrans is less than the transmission threshold temperature THtrans, then the transmission is warmed by sending heated coolant leaving the block to the transmission as shown in block 260 and FIG. 1B.

If the temperature of the transmission Ttrans is greater than the threshold and transmission cooling is desired, then cooled coolant is sent through the transmission heat exchanger as shown in block 280 and FIG. 1C.

Referring now to FIG. 1A, a pump 45 forces coolant through the engine 20 through various conduits 65. At least one conduit is connected to the block 25 and at least one conduit is connected to the head 30. An engine bypass conduit 87 bypasses the engine. In this case, the head 30 warms up quickly being next to the combustion taking place in the cylinders 35. Initially fluid exiting the head valve 60 (a one input, two output valve) may flow counterclockwise to avoid going through the radiator until all the components reach optimal temperatures. When the temperatures are all above the threshold temperatures, the coolant will eventually flow clockwise and travel through the radiator. It is more important that the temperature of the block 25 heats up so coolant exiting the block 25 enters block valve 55 and travels through the bypasss conduit 120 where it recirculates through the pump and enters the block 25 and/or head 30 and gets heated up again. In this example, the block cooling circuit comprises the coolant input into the block, ducts or passageways in the block (not shown) and the coolant existing the block.

Referring now to FIG. 1B wherein the temperature of the transmission Ttrans is less than the threshold temperature of the transmission THtrans and the temperature of the block Tblock is greater than the threshold temperature of the block THblock, it is desired to warm up the transmission 40. Thus, in the embodiment, coolant leaving the block entering the block valve is sent to the transmission heat exchanger 85 so that the transmission can then be warmed up. After exiting the transmission heat exchanger 85, the coolant continues circulating through the circuit but not necessarily through the radiator until all the components have been warmed up.

Referring now to FIG. 1C, where both the transmission and block temperatures are greater than the respective thresholds, the transmission warming is shut down and transmission cooling is desired. In order to provide maximum cooling, it is best to have cooled coolant cycled through each of the block 25, head 30 and transmission 40. The block 25 and head 30 are fed using conduits 65 as discussed earlier. The transmission 40 is fed directly using the engine bypass conduit 87 which is in fluid communication with the transmission heat exchanger 85. A transmission cooling valve 80 opens to allow cooled coolant to flow to the transmission heat exchanger 85 which then may circulates through the radiator 15. Coolant exiting the block 25 and head 30 also circulates through the radiator 15 to exchange heat with the environment.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of thermally managing a transmission, the transmission having a transmission heat exchanger and coupled to an engine having a block, and a cooling circuit including a block cooling circuit wherein the block cooling circuit receives coolant from the cooling circuit, the method comprising:
   determining a temperature of the transmission and a temperature of the block;
   if the temperature of the transmission is below a threshold temperature of the transmission and the temperature of the block is below a block temperature threshold, flowing coolant through the block cooling circuit and into the cooling circuit and bypassing the transmission heat exchanger;
   if the temperature of the transmission is below the threshold temperature of the transmission and the temperature of the block is above the threshold temperature of the block, flowing coolant from the block cooling circuit through the transmission heat exchanger and back into the cooling circuit;
   if the temperature of the transmission is above the transmission threshold temperature and the temperature of the block is above block threshold temperature, flowing coolant through the block cooling circuit and flowing coolant directly through the transmission heat exchanger.

2. The method of claim 1 wherein the step of determining the temperature comprises calculating temperatures.

3. The method of claim 1 further comprising flowing coolant through a radiator if the temperature of the transmission is above the transmission threshold temperature and the temperature of the block is above block threshold temperature.

4. The method of claim 1 further comprising providing a transmission cooling valve in fluid communication with the transmission heat exchanger wherein the method includes opening the transmission cooling valve to allow coolant to flow through the transmission heat exchanger.

5. The method of claim 1 wherein the engine further comprises a head and the cooling circuit further comprises a head cooling circuit which receives coolant from the cooling circuit and wherein the method further comprises directing coolant exiting the head cooling circuit to bypass when the temperature of the transmission is below a threshold temperature of the transmission and the temperature of the block is below a block temperature threshold.

6. The method of claim 1 wherein the engine further comprises a head and the cooling circuit further comprises a radiator and a head cooling circuit which receives coolant from the cooling circuit and wherein the method further comprises directing coolant existing the head cooling circuit to the radiator when the temperature of the transmission is above a threshold temperature of the transmission and the temperature of the block is above a block temperature threshold.

7. A system for thermally managing a transmission having a transmission heat exchanger, wherein the transmission is coupled to an engine having a block and a cooling circuit having a block cooling circuit which receives coolant from the cooling circuit, the system comprising:
   a controller having logic to determine a temperature of the transmission and a temperature of the block;
   if the temperature of the transmission is below a threshold temperature of the transmission and the temperature of the block is below a block temperature threshold, the controller directs coolant through the block cooling circuit and into the cooling circuit and bypassing the transmission heat exchanger;
   if the temperature of the transmission is below the a threshold temperature of the transmission and the temperature of the block is above the threshold temperature of the block, the controller directs coolant from the block cooling circuit through the transmission heat exchanger and back into the cooling circuit;
   if the temperature of the transmission is above the transmission threshold temperature and the temperature of the block is above block threshold temperature, the controller directs coolant through the block cooling circuit and cooled coolant flows directly through the transmission heat exchanger.

8. The system of claim 7 further comprising a transmission cooling valve in fluid communication with the transmission heat exchanger wherein the controller directs opening the transmission cooling valve to selectively allow coolant to flow through the transmission heat exchanger.

9. The system of claim 7 wherein the engine further comprises a head and the cooling circuit further comprises a head cooling circuit which receives coolant from the cooling circuit and wherein the controller directs coolant existing the head cooling circuit to bypass when the temperature of the transmission is below a threshold temperature of the transmission and the temperature of the block is below a block temperature threshold.

* * * * *